Patented June 19, 1923.

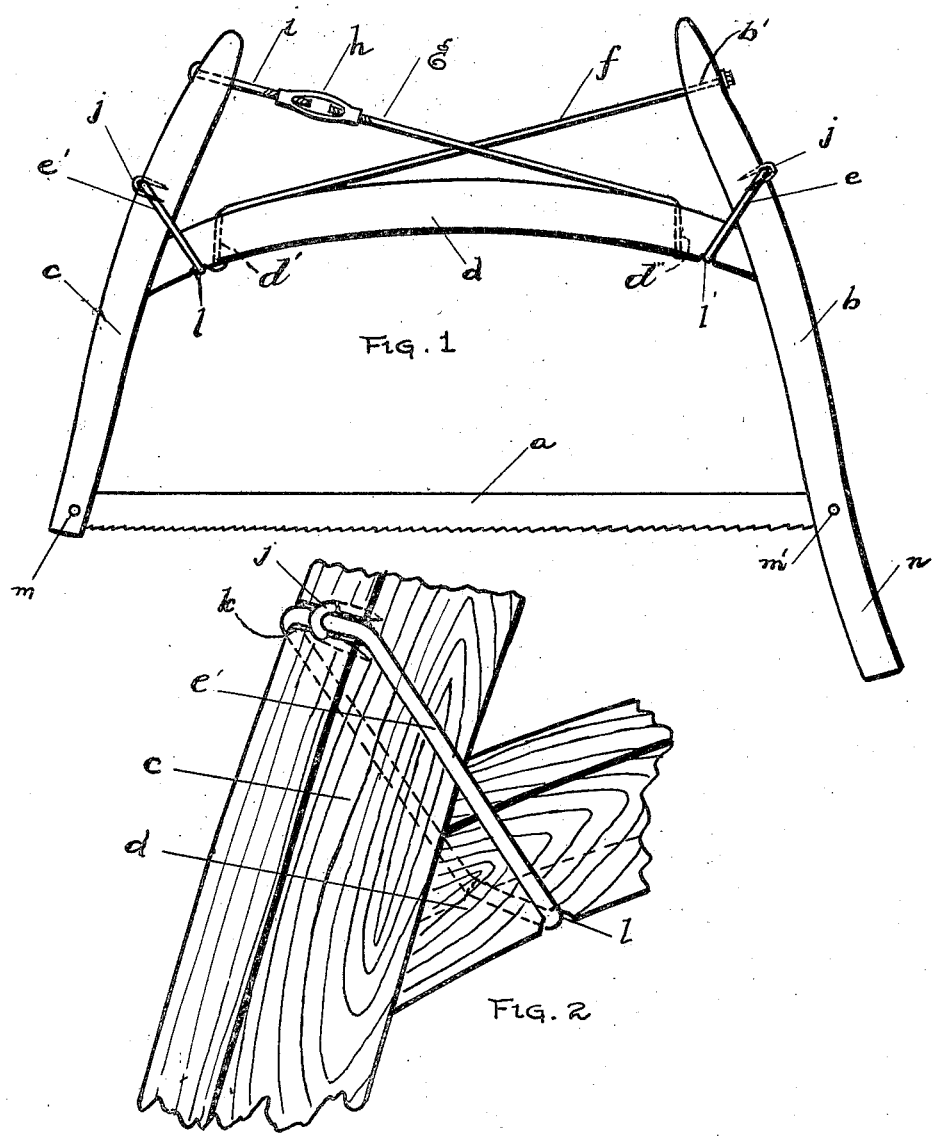

1,459,359

UNITED STATES PATENT OFFICE.

DANIEL P. BUCKLEY, OF FITCHBURG, MASSACHUSETTS, ASSIGNOR, BY MESNE ASSIGNMENTS, TO SIMONDS SAW AND STEEL COMPANY, OF FITCHBURG, MASSACHUSETTS, A CORPORATION OF MASSACHUSETTS.

SAW FRAME.

Application filed August 5, 1922. Serial No. 579,904.

*To all whom it may concern:*

Be it known that I, DANIEL P. BUCKLEY, a citizen of the United States of America, and resident of Fitchburg, in the county of Worcester and State of Massachusetts, have invented new and useful Improvements in Saw Frames, of which the following is a specification.

This invention relates to frames for supporting saw blades and particularly to that type known as buck-saws. Objects of the invention are to produce a frame which is stronger and more rigid than the usual type of saw frame, which can be manufactured at a low cost and be easily assembled, and which does not have the usual tendency of buck-saw frames to collapse when the tension on the blade is relieved.

In order to illustrate the invention, one concrete embodiment thereof is shown in the accompanying drawing, in which:—

Fig. 1 is a side elevational view of a saw frame embodying the features of the invention; and Fig. 2 is an enlarged perspective view of one of the joints of the frame;

The embodiment of the invention shown for the purpose of illustration comprises a buck-saw in which the blade $a$ is supported in the usual manner as by pins $m$ and $m'$ in the two end members $b$ and $c$ of the frame, the member $b$ being longer than member $c$ to provide the usual handle $n$. Interposed between the end members $b$ and $c$ in spaced relation to blade $a$ is a cross-piece $d$. The cross-piece $d$ is held in abutting relationship with end members $b$ and $c$ by loops $e$ and $e'$ which are preferably constructed of heavy wire bent to shape with the abutting ends welded together. To prevent the loops $e$ from moving along cross-piece $d$ and members $b$ and $c$ they preferably seat in recesses $k$, $l$ and $l'$ therein and are further held on the end members by suitable retainers such as staples $j$ and $j'$ which prevent the loops from being lost when the frame is disassembled.

Member $b$ is also connected to cross-piece $d$ by a tension member $f$. This member may comprise a headed rod passing through a hole $d'$ in the end of cross-piece $d$ remote from member $b$. After passing through opening $d'$ rod $f$ is bent as shown and the free end thereof passes through an opening $b'$ in member $b$ and the outer end is provided with a suitable washer and nut. End member $c$ is connected to the end of the cross-piece $d$ remote therefrom by a tensioning device comprising headed rod $g$ extending through similar opening $d''$ in cross-piece $d$ and a shorter headed rod $i$ extending through the free end of member $c$, the adjacent ends of rods $i$ and $g$ being connected by a turn-buckle $h$.

By tightening turn-buckle $h$, the lower end of end member $c$ is swung outwardly thereby putting tension on the blade $a$. As the blade is tensioned, the upper end of end member $b$ swings slightly to the right thereby tensioning rod $f$ to substantially the same degree as rod $g$. In this way, the parts are rigidly braced together with the blade under any desired tension.

The ends of the cross-piece are not mortised into the end members but are merely held in abutting relationship. Thus the connection between the cross-piece and each of the end members constitutes a slip connection which permits the cross-piece to slip slightly on the end members while the blade is being tensioned, thereby to wedge the ends of the cross-piece into the loops $e$ and $e'$. Inasmuch as the necessity of recessing the end members to receive the ends of the cross-piece is eliminated by the present construction, the end members are thus stronger and less liable to break at the ends of the cross-piece.

I claim:

1. A saw frame comprising two end members and a cross-piece, the ends of the cross-piece being constructed and arranged to abut said members, and means connecting both ends of the cross-piece to each end member to form a rigid structure.

2. A saw frame comprising two end members and a cross-piece, the ends of the cross-piece being constructed and arranged to abut said members, and spaced members on said end members engaging opposite ends of said cross-piece to form a rigid truss structure.

3. A saw frame comprising two end members and a cross-piece, a loop connection between each end member and the adjacent end of the cross-piece, and tensioning means extending from each end member to the end of the cross-piece remote therefrom.

4. A saw frame comprising two end members and a cross-piece, the ends of the cross-piece being constructed and arranged to abut said members, a loop connection between each end member and the adjacent end of the cross-piece, and tensioning means extending from each end member to the end of the cross-piece remote therefrom.

5. A saw frame comprising two end members and a cross-piece, a loop on each end member for making a slip connection with the adjacent end of the cross-piece, and a tensioning member on each end member engaging the end of the cross-piece remote therefrom, thereby forcibly to retain the ends of the cross-piece in said loops.

6. A saw frame comprising two end members and a cross-piece, the ends of said cross-piece being adapted to abut said members obliquely, loops on said members arranged to encircle the ends of said cross-piece, and means for forcing the ends of said cross-piece into said loops to wedge the parts together.

7. A saw frame comprising two end members and a cross-piece, the ends of said cross-piece being adapted to abut said members obliquely, loops on said members arranged to encircle the ends of said cross-piece, and tensioning members engaging said cross-piece in spaced relation to said loops to wedge and retain the ends thereof in said loops.

8. A saw frame comprising spaced members, a cross-piece engaging said members intermediate their ends, a loose connection between the cross-piece and the members comprising a loop on each member in which the end of the cross-piece fits in abutting relation with the member, and crossed tensioning rods extending from the opposite ends of said cross-piece to said members, whereby a rigid truss structure is formed.

9. A saw frame comprising spaced members, a cross-piece engaging said members intermediate their ends, a loose connection between the cross-piece and the members comprising a loop on each member in which the end of the cross-piece fits in abutting relation with the member, and crossed tensioning rods extending from the opposite ends of said cross-piece to said members, one of said rods, having a turn-buckle for tensioning a saw blade supported by said members.

10. A saw frame comprising spaced members adapted to support a saw blade therebetween, and a truss structure connecting said members in spaced relation to the blade, said structure comprising a cross-piece adapted to abut both said members, and means connecting both ends of said cross-piece to each member including a loop encircling each member and the adjacent end of the cross-piece, and a tensioning rod extending from each member to the end of the cross-piece remote therefrom.

Signed by me at Fitchburg, Massachusetts, this thirty-first day of July, 1922.

DANIEL P. BUCKLEY.